(12) United States Patent
Josefsson et al.

(10) Patent No.: US 12,084,871 B2
(45) Date of Patent: Sep. 10, 2024

(54) UNDERLAY ELEMENT FOR FLOORING AND FLOOR ASSEMBLY

(71) Applicant: Ceraloc Innovation AB, Viken (SE)

(72) Inventors: Per Josefsson, Ramlösa (SE); Richard Olofsson, Helsingborg (SE); Martin Bjeremyr, Helsingborg (SE)

(73) Assignee: CERALOC INNOVATION AB, Viken (SE)

( * ) Notice: Subject to any disclaimer, the term of this patent is extended or adjusted under 35 U.S.C. 154(b) by 241 days.

(21) Appl. No.: 17/645,082

(22) Filed: Dec. 20, 2021

(65) Prior Publication Data

US 2022/0195740 A1 Jun. 23, 2022

(30) Foreign Application Priority Data

Dec. 21, 2020 (SE) .................................... 2051516-9

(51) Int. Cl.
*E04F 15/22* (2006.01)
*B32B 3/06* (2006.01)
(Continued)

(52) U.S. Cl.
CPC .............. *E04F 15/203* (2013.01); *B32B 3/06* (2013.01); *B32B 3/18* (2013.01); *B32B 5/32* (2013.01); *B32B 7/12* (2013.01); *B32B 27/08* (2013.01); *B32B 27/304* (2013.01); *B32B 27/32* (2013.01); *B32B 2266/025* (2013.01);
(Continued)

(58) Field of Classification Search
CPC ...... E04F 15/203; B32B 3/18; B32B 2471/00; B32B 7/12; B32B 5/32; B32B 3/06
See application file for complete search history.

(56) References Cited

U.S. PATENT DOCUMENTS 4,191,722 A * 3/1980 Gould ..................... E04D 1/265
264/46.7
4,694,627 A 9/1987 Omholt
(Continued)

FOREIGN PATENT DOCUMENTS

DE 20 2015 100 204 U1 2/2015
EP 1 038 661 A1 9/2000
(Continued)

OTHER PUBLICATIONS

U.S. Appl. No. 17/061,881, Per Josefsson, Christoffer Nilsson, Niclas Håkansson, filed Oct. 2, 2020, (Cited herein as US Patent Application Publication No. 2021/0102383 A1 of Apr. 8, 2021).
(Continued)

*Primary Examiner* — Basil S Katcheves
(74) *Attorney, Agent, or Firm* — Boone IP Law

(57) ABSTRACT

An underlay element configured to be provided between a floor covering and a subfloor. The underlay element includes a base matrix and a plurality of restriction members at least partly embedded in the base matrix. The base matrix includes a first material which is compressible and, preferably, foamed. The restriction members include a second material, wherein a size of each of the restriction members exceeds 0.25 mm in at least one direction. A compression of the underlay element is configured to be restricted by the restriction members. Also, a corresponding floor assembly including a floor covering and an underlay element.

19 Claims, 6 Drawing Sheets

(51) Int. Cl.
  *B32B 3/18*   (2006.01)
  *B32B 5/32*   (2006.01)
  *B32B 7/12*   (2006.01)
  *B32B 27/08*  (2006.01)
  *B32B 27/30*  (2006.01)
  *B32B 27/32*  (2006.01)
  *E04F 15/20*  (2006.01)

(52) U.S. Cl.
  CPC .............. *B32B 2307/7242* (2013.01); *B32B 2307/7265* (2013.01); *B32B 2307/732* (2013.01); *B32B 2471/00* (2013.01)

(56) References Cited

U.S. PATENT DOCUMENTS

| | | | |
|---|---|---|---|
| 5,055,339 A | 10/1991 | Eder et al. | |
| 6,383,608 B1* | 5/2002 | Burkett | B29C 44/1266 |
| | | | 428/317.1 |
| 2002/0073640 A1 | 6/2002 | Virtanen | |
| 2002/0160680 A1* | 10/2002 | Laurence | B44C 3/02 |
| | | | 442/394 |
| 2003/0219582 A1 | 11/2003 | Ramesh et al. | |
| 2007/0137139 A1 | 6/2007 | Tierney et al. | |
| 2007/0289238 A1 | 12/2007 | Payne et al. | |
| 2008/0292854 A1* | 11/2008 | Miller | C04B 38/0032 |
| | | | 428/219 |
| 2009/0202776 A1* | 8/2009 | Brandon | B32B 21/10 |
| | | | 428/56 |
| 2010/0272969 A1* | 10/2010 | Taylor | A41D 31/285 |
| | | | 428/196 |
| 2011/0061328 A1 | 3/2011 | Sandy et al. | |
| 2012/0055108 A1 | 3/2012 | Bierwirth | |
| 2012/0135220 A1 | 5/2012 | Keane | |
| 2012/0238168 A1* | 9/2012 | Tompkins | B32B 5/18 |
| | | | 428/221 |
| 2012/0276364 A1* | 11/2012 | Kennedy | B32B 15/046 |
| | | | 156/305 |
| 2012/0291387 A1 | 11/2012 | Keane | |
| 2015/0110988 A1* | 4/2015 | Peavey | B29C 48/154 |
| | | | 29/897 |
| 2017/0072656 A1* | 3/2017 | Dodworth | B32B 37/146 |
| 2017/0312148 A1* | 11/2017 | Dobrosielska-Oura | |
| | | | A61F 13/539 |
| 2017/0314259 A1 | 11/2017 | Pelletier | |
| 2017/0316670 A1* | 11/2017 | Desgorces | B32B 7/12 |
| 2018/0111351 A1* | 4/2018 | Madaus | B32B 5/028 |
| 2018/0347207 A1 | 12/2018 | Hayes et al. | |
| 2019/0242068 A1* | 8/2019 | Penland, Jr. | B32B 21/045 |
| 2019/0292793 A1 | 9/2019 | Van Vlassenrode et al. | |
| 2020/0141131 A1 | 5/2020 | Cormier et al. | |
| 2020/0232133 A1 | 7/2020 | Bush et al. | |
| 2020/0282589 A1 | 9/2020 | Josefsson et al. | |
| 2021/0102383 A1 | 4/2021 | Josefsson et al. | |
| 2022/0105701 A1 | 4/2022 | Mohan et al. | |

FOREIGN PATENT DOCUMENTS

| | | |
|---|---|---|
| WO | WO 2007/149178 A2 | 12/2007 |
| WO | WO 2012/030770 A1 | 3/2012 |
| WO | WO 2018/156691 A1 | 8/2018 |
| WO | WO 2019/018508 A1 | 1/2019 |
| WO | WO 2020/096628 A1 | 5/2020 |
| WO | WO 2020/168176 A1 | 8/2020 |
| WO | WO 2020/180237 A1 | 9/2020 |

OTHER PUBLICATIONS

Office Action and accompanying search report issued in Swedish Patent Application No. 2051516-9, Aug. 27, 2021, PRV Swedish Patent and Registration Office, 7 pages.
International Search Report and Written Opinion mailed Mar. 3, 2022 in PCT/SE2021/051288, ISA/SE, Patent-och registreringsverket, Stockholm, SE, 10 pages.
U.S. Appl. No. 17/061,881, Per Josefsson, filed Oct. 2, 2020.
International Preliminary Report on Patentability received for PCT Patent Application No. PCT/SE2021/051288, mailed on Jun. 29, 2023, 6 pages.

* cited by examiner

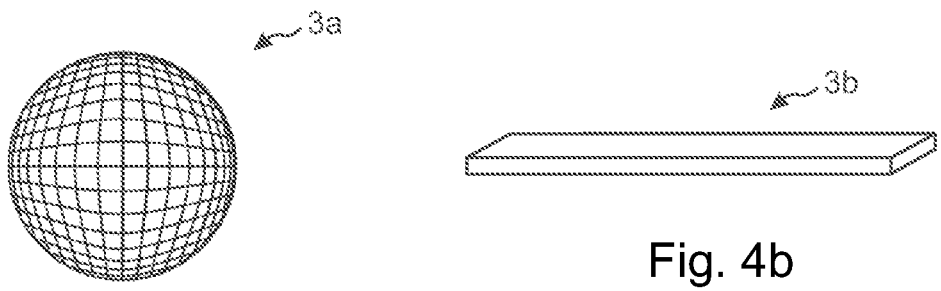
Fig. 4a
Fig. 4b
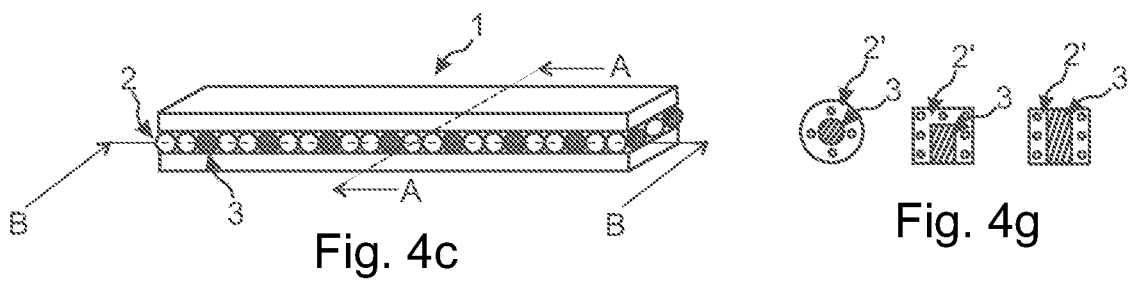
Fig. 4c
Fig. 4g
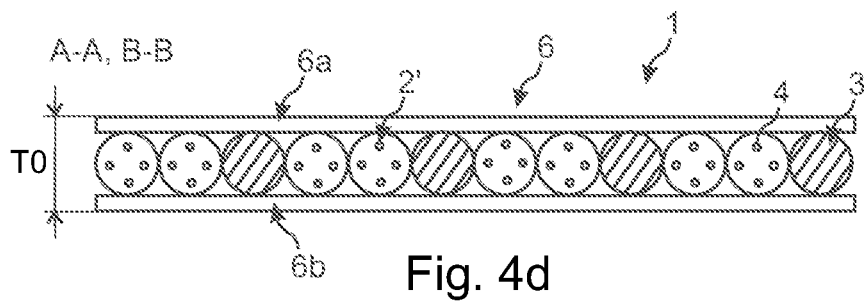
Fig. 4d
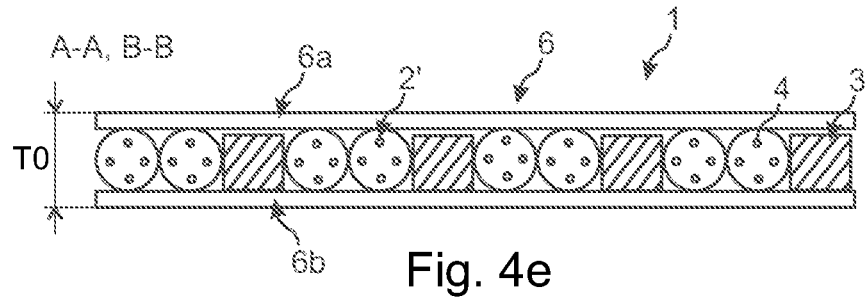
Fig. 4e
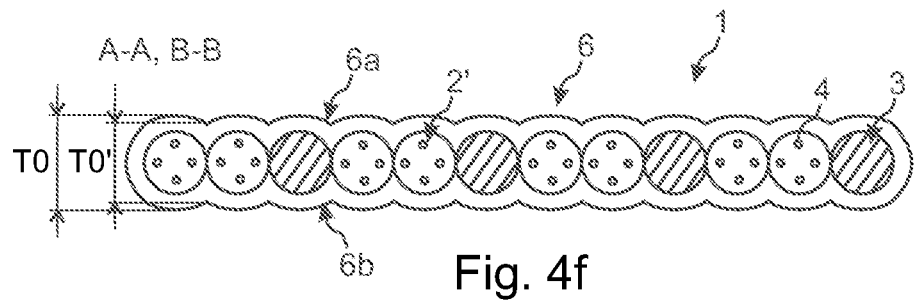
Fig. 4f

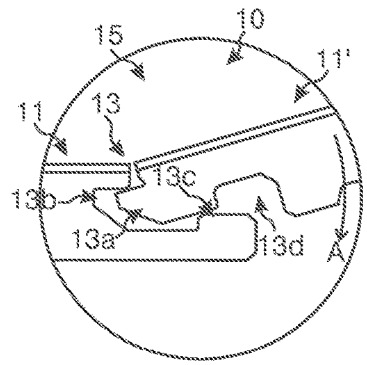 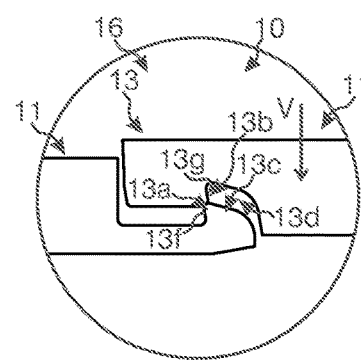 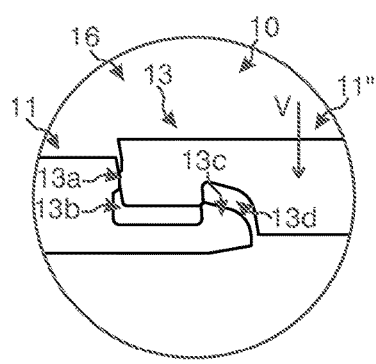
Fig. 6a    Fig. 6b    Fig. 6c
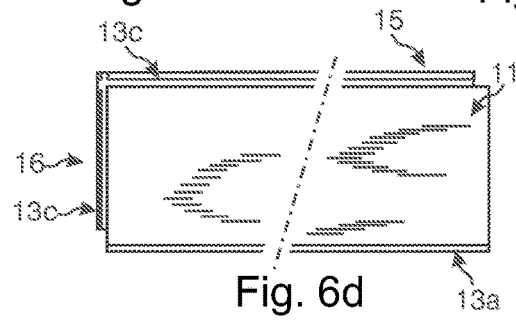 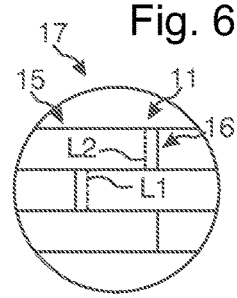
Fig. 6d    Fig. 6e
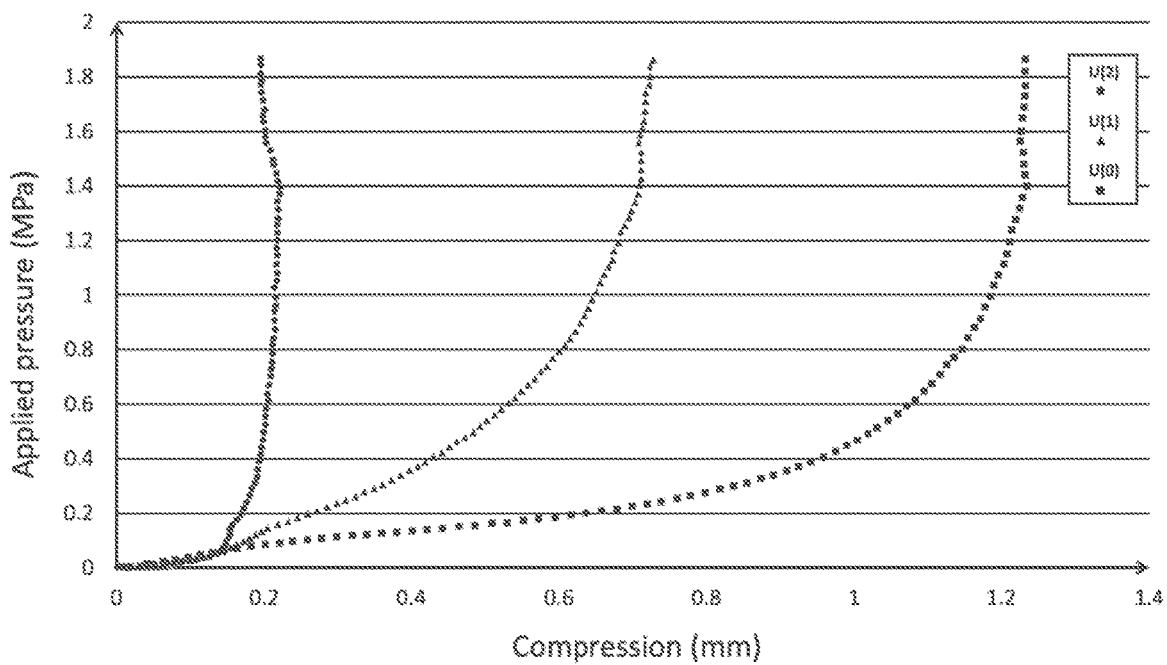
Fig. 6f

UNDERLAY ELEMENT FOR FLOORING AND FLOOR ASSEMBLY

CROSS REFERENCE TO RELATED APPLICATIONS

The present application claims the benefit of Swedish Application No. 2051516-9, filed on Dec. 21, 2020. The entire contents of Swedish Application No. 2051516-9 are hereby incorporated herein by reference in their entirety.

TECHNICAL FIELD

The disclosure generally relates to an underlay element for flooring. More specifically, the disclosure relates to an underlay element configured to be provided between a floor covering and a subfloor. The underlay element may be provided loosely on the subfloor and the floor covering may be floating on the underlay element. Alternatively, the underlay element may be attached to the floor covering and/or the subfloor. The underlay element may be used in conjunction with a thermoplastic-based floor covering or a thin laminate floor covering, but other floor coverings are equally conceivable. The disclosure also relates to a floor assembly comprising a floor covering and an underlay element.

BACKGROUND

An underlayment, such as a foam, may be used for separating a floor arrangement from a subfloor. The underlayment may compensate for an unevenness of the subfloor and may, for example, reduce the risk of damaging components of the floor arrangement, such as floor tiles. Moreover, the underlayment may improve the characteristics of the floor arrangement, such as its comfort and/or sound properties, e.g., the reflective walking sound and/or impact sound. In some configurations, the underlayment may function as a moisture barrier.

Some types of floor tiles provided on an underlayment are more prone to becoming deformed or even damaged when subject to load or stress, especially during an extended period of time, such as in a Castor chair test where high local forces may occur. In particular, mechanical locking systems provided in the floor tiles may become negatively affected. This type of problems may particularly arise for thin floor tiles and/or for floor tiles having low elastic moduli. Examples include, e.g., plastic flooring and thin laminate flooring. The displacement of certain portions of the floor tiles during load or stress may become too large. Indeed, a foam having a thickness of 2 mm may displace the floor tiles up to 2 mm.

Moreover, the underlayment typically becomes compressed over time, whereby it may lose some of its original function.

Attempts to ameliorate at least some aspects of the above-mentioned underlayments have been made. By way of example, the underlayment may be made stronger, e.g., by being stiffer or having a higher density, or it may be made thinner. The compressibility of a thinner underlayment may be reduced at least to a degree.

However, any of these modifications of the underlayment may compromise one or several of the advantages mentioned above. Additionally, the underlayment may become too expensive and/or too heavy. Moreover, the comfort or insulation properties of such an underlayment may sometimes become unsatisfactory. Also, its insulation property may be insufficient for some applications. Other problems that may arise are that they may lose their elasticity and/or shape over time.

In view of the above discussion, it is clear that there is a need for improved underlayments, which solve at least some of the problems stated above, preferably while preserving at least some of the advantages described above.

SUMMARY

It is therefore an object of at least embodiments of the present disclosure to provide an underlay element for a floor covering for which the compression degree is more controlled.

Another object of at least embodiments of the present disclosure is to provide an underlay element for which the compression is restricted, preferably during an extended amount of time. For example, the restricted compression may be maintained even after being subject to pressure from a floor covering during a long period of time induced by daily use, which may include pressure from sustained static loads (e.g., pressure from the floor covering itself and/or from furniture) and/or dynamic pressure variations (e.g., pressure from a person walking on the floor covering).

It is also an object of at least embodiments of the present disclosure to provide an underlay element, which during use is configured to reduce deterioration of at least a portion of a floor covering provided on the underlay element, especially deterioration of a locking device provided at an edge of floor panels provided in the floor covering. Also, cupping or curling effects (preferably, width and/or length, surface flatness) of floor panels may be reduced.

Yet another object of at least embodiments of the present disclosure is to provide such an underlay element while maintaining or even improving at least some of the typical characteristics of known underlayments, such as their ability to compensate for an unevenness of a subfloor, cushioning effect, sound dampening properties, cost efficiency, or thermal insulation properties.

An additional object of at least embodiments of the present disclosure is to provide a floor assembly comprising a floor covering and an underlay element in accordance with any of the objects above.

These and other objects and advantages that will be apparent from the description have been achieved by the various aspects, embodiments and examples described below.

In accordance with a first aspect of the disclosure, there is provided an underlay element configured to be provided between a floor covering and a subfloor. The underlay element comprises a base matrix and a plurality of restriction members at least partly embedded in the base matrix. The base matrix comprises a first material, wherein the first material is compressible and wherein the first material preferably is foamed. The restriction members comprise a second material, wherein a size of each of the restriction members exceeds 0.25 mm in at least one direction, such as in the thickness direction of the underlay element. A compression of at least a portion of the underlay element, such as the entire underlay element, is configured to be restricted by the restriction members.

The underlay element may become partially compressed over time in its thickness direction. However, the second material may provide a certain dampening effect of the compression. Thereby, the compression of the underlay element may be restricted, for example at a given instant or over a long period of time.

Moreover, during use together with a floor covering provided on the underlay element, the underlay element may reduce a displacement of at least a portion of the floor covering provided on the underlay element, such as at an edge of floor panels provided in the floor covering where a locking device may be provided. Thereby, deterioration of at least a portion of a floor covering may be reduced.

The second material may reinforce the underlay element. Moreover, it may control a compression rate and/or a compression degree of the underlay element. Preferably, however, the underlay element is resilient to a certain degree, e.g., such that it may compensate for an unevenness of a subfloor and/or provide a cushioning effect. Optionally, the second material may also provide an improved thermal insulation and/or moisture barrier.

By having a low-cost base matrix and/or low-cost restriction members, a cost effective underlay element may be provided while maintaining or even improving at least some of the typical characteristics of known underlayments, cf. the discussion above.

An uncompressed thickness may be a maximal thickness of said at least a portion of the underlay element.

In some embodiments, the compression does not exceed 0.60 mm, preferably not exceeding 0.30 mm, at an applied pressure of 1.90 MPa. This may be referred to as an absolute bound on the compression. It has been found that for these parameters a deterioration of at least portions of a floor covering provided thereon may become significantly reduced, especially for, but not limited to, a thickness of the underlay element of 1.0-3.0 mm. This is particularly true for a locking device provided at an edge of floor panels provided in the floor covering. Furthermore, this is particularly true for the thermoplastic floor coverings and thin laminate floor coverings disclosed herein.

The compression of said at least a portion of the underlay element, such as the entire underlay element, may be restricted by not exceeding 50%, such as not exceeding 30% or not exceeding 20%, of an uncompressed, preferably maximal, thickness of the underlay element. It is emphasized that in some embodiments, any of these bounds, which may be referred to as a relative bounds on the compression, may be combined with any of the bounds on the absolute compression disclosed herein.

A thickness of the underlay element and/or the base matrix may be 0.4-3.0 mm, such as 1.0-2.5 mm.

For a thickness of the underlay element of 0.4-0.6 mm the compression may not exceed 0.20 mm at an applied pressure of 1.90 MPa.

Preferably, the underlay element has an essentially uniform thickness. For example, the underlay element, preferably the base matrix, may comprise a sheet assembly comprising at least one sheet, such as a single sheet. The restriction members may be at least partly embedded in the sheet assembly. Optionally, and as detailed below, the sheet(s) may comprise cavities for accommodating the restriction members. In some embodiments, the thickness of the underlay element may be slightly varying. For example, it may include a protruding pattern on the top surface and/or the bottom surface, such as being undulating or ribbed.

The underlay element may be flexible. For example, it may be configured to be provided on a roll or it may be foldable into folded sections. The underlay element may be configured to be cut to an appropriate size, such as by a knife or by scissors. Thereby, it may assume dimensions suitable for installation on a given subfloor.

The underlay element may be adapted to be used in combination with a floor covering, preferably comprising at least one floor panel, such as a plurality of floor panels.

The size of the restriction members may exceed 0.30 mm or exceeding 0.40 mm in at least one direction, such as in the thickness direction of the underlay element. In some embodiments, the size may exceed 1.00 mm in at least one direction, such as in said thickness direction.

In some embodiments, the size of the restriction members may exceed 0.25 mm in two or three perpendicular directions. In some embodiments, the size of the restriction members may exceed 0.30 mm or exceeding 0.40 mm or even exceeding 1.00 mm, in two or three perpendicular directions. In any of these embodiments, one of these directions may be parallel with said thickness direction. Clearly, the size of the restriction members in one direction is limited by the thickness of the underlay element along the thickness direction.

The restriction members may have about the same sizes and/or shapes. In some embodiments, however, the restriction members may have varying sizes and/or shapes.

The restriction member(s), such as its/their outer surface, may take the shape of a sphere, cylinder, rectangular parallelepiped, an irregular surface, etc.

The base matrix and/or underlay element is preferably extruded and/or calendered, but forming by molding, e.g., injection moulding, is also conceivable.

Generally herein, the second material may comprise recycled material. Thereby, the cost of the underlay element may be reduced.

The restriction members may comprise particles, such as granulates or flakes, and/or strips, such as strings, cords or strands. The strips may have a longitudinal extension, which may exceed 5 mm, such as exceeding 10 mm or even 20 mm.

The restriction members may be essentially uniformly distributed throughout the base matrix. This may be preferred when the restriction members have about the same sizes and/or shapes. However, it is equally conceivable that, in some embodiments, the restriction members are irregularly distributed throughout the base matrix.

A density of the second material may be greater than a density of the first material. For example, the restriction members and/or the second material may be solid. In some embodiments, however, the density of the second material may be smaller than the density of the first material. For example, the restriction members and/or the second material may be hollow.

Generally, a density of the first material may be less than 700 kg/m$^3$ or less than 600 kg/m$^3$. In some embodiments, the density of the first material may be less than 500 kg/m$^3$, such as 20-350 kg/m$^3$ or 70-250 kg/m$^3$. Thereby, the weight and/or the material cost of the underlay element may be reduced.

Generally, a density of the second material may be 200-2700 kg/m$^3$, preferably 800-1200 kg/m$^3$. A density of the second material, for example comprising or entirely consisting of a polymeric material, such as rubber, may be 400-2100 kg/m$^3$, preferably 800-1500 kg/m$^3$. The second material may comprise at least one filler as described elsewhere herein.

A modulus of elasticity, or Young's modulus E, of the second material may be greater than a modulus of elasticity of the first material.

Here, and throughout the disclosure, a thermoplastic material may be distinguished from a cross-linked thermoplastic material. The thermoplastic material may be a thermosoftening plastic material and the cross-linked thermoplastic material may comprise cross-linked polymers and, optionally, a thermosoftening plastic material. For example, the crosslinking may be accomplished by chemical reactions or by irradiation.

The first material may comprise a polymeric material, such as a thermoplastic material or a cross-linked thermoplastic material. The thermoplastic material may provide a softer and more flexible base matrix with an improved rebound resilience. The cross-linked thermoplastic material may be more rigid and may provide an increased glass transition temperature and/or chemical resistance. For example, the base matrix or the underlay element as a whole may comprise, or in some cases entirely consist of, a cross-linked thermoplastic material having a degree of cross-linking between 40% and 80%.

Preferably, the polymeric material of the first material is foamed, such as by a blowing agent. For example, the first material may comprise polyethylene (PE), preferably irradiation cross-linked PE (IXPE), ethylene vinyle acetate (EVA), polyethylene terephthalate (PET), polypropylene (PP), preferably extruded PP (XPP) or cross-linked PP (IXPP), polystyrene (PS), preferably extruded PS (XPS) or expanded PS (EPS), or polyolefin (PO), preferably cross-linked PO (XPO).

The first material may comprise a cellular foam. For example, a cell or pore size may range from 10 to 1300 microns. The cellular foam may be a closed-cell foam which may provide a more rigid base matrix and which may provide an improved thermal insulation and/or moisture barrier. An open-cell foam, however, is equally conceivable, which may provide a more lightweight base matrix and may provide improved sound dampening. Also, the amount of material needed in the base matrix may be reduced.

The first material may comprise at least one filler. The filler may comprise an organic filler and/or an inorganic filler. Any of these fillers may increase the flexural strength and/or rigidity of the underlay element. The organic filler may also provide a light-weight material that may reduce a weight of the underlay element. For example, the organic filler may comprise cork particles and/or wood-based particles, such as wood fibres or wood flour. A top cut, such as a particle size D98, of the wood-based particles may be 1000 µm.

Alternatively, a particle size may be less than 1000 µm, preferably according to ASTM E11-17. For example, the particle size may be 0-250 µm, e.g., 40% of which may be greater than 75 µm. A bulk density of the wood-based particles may be 100-250 kg/m$^3$. The cork particles may have a modulus of compression of 8-20 MPa and/or a bulk density of 55-320 kg/m$^3$, such as 55-240 kg/m$^3$. The first material may comprise cork particles to a degree of up to 70 wt %. For example, the inorganic filler may comprise a mineral-based material, such as calcium carbonate (CaCO3), barium sulphate, wollastonite, talc, sand material, clay material, such as bentonite, or glass fibres.

Here and throughout the disclosure, especially for a, preferably inorganic, filler in the first and/or second material, a filler may have, preferably average, size not exceeding 0.106 mm, such as not exceeding 0.10 mm, preferably in two or three perpendicular dimensions. An organic filler in the first and/or second material may have preferred size smaller than 0.25 mm, preferably in two or three perpendicular dimensions. In some embodiments herein, a particle size of the inorganic and/or organic filler in the first and/or second material may be determined according to ASTM E11-17.

In some embodiments, however, the first material does not comprise cork and/or a wood-based material. Alternatively, or additionally, also the second material does not comprise cork and/or a wood-based material.

The second material may be compressible.

A compressive strength of the second material may be greater than a compressive strength of the first material. Thereby, the compressive strength (CS) of at least a portion of the underlay element, preferably the underlay element as a whole, may be increased, e.g., compared to a base matrix per se only comprising the first material.

A compressive strength of the first material may be 20-800 kPa, such as 60-250 kPa. Preferably, the standard CEN/TS 16354:2013 (referring to SS-EN 826:2013) is used, which measures the compressive strength at 0.5 mm deformation.

The second material may comprise a polymeric material, such as a thermoplastic material or a cross-linked thermoplastic material, optionally comprising at least one filler, and/or a mineral-based material, such as calcium carbonate (CaCO3) or a sand material. For example, the filler may comprise an organic filler and/or an inorganic filler and may be a functional filler and/or an extender. The inorganic filler may comprise a mineral-based material, such as calcium carbonate or a sand material, such as sand powder, or similarly. The organic filler may comprise organic fibers, e.g., cork particles, wood-based particles, such as wood fibres or wood flour, or rice husks. Non-limiting examples of a particle size, modulus of compression, density and degree of the cork particles and/or wood-based particles may be the same as those for the first material specified above, whereby reference is made thereto. In some embodiments, the filler may comprise a clay material, such as kaolin. For example, the amount of filler in the second material may be 5-20 wt % or 20-90 wt %, such as 40-80 wt %.

In some embodiments, the second material comprises a cured or hardened adhesive.

The second material and/or the restriction members may be solid. Preferably, the second material is non-foamed. In some embodiments, however, the second material and/or the restriction members may be hollow, e.g., for reducing the weight of the underlay element.

The material compositions of the first and second materials may be different. For example, the first and second materials may comprise different types of polymeric materials, such as thermoplastic materials.

In some embodiments, the material compositions of the first and second materials may be substantially the same. For example, the first and second materials may comprise the same type of polymeric materials, such as thermoplastic materials. However, the polymeric materials may differ by at least one element selected from the group of a grade, a density, a miscibility, a degree of crosslinking, an amount of filler(s), and an amount of additives.

The first and second materials may be based on the same type of thermoplastic material, wherein the first material is a thermoplastic material and the second material is a cross-linked thermoplastic material. For example, the second material may be crosslinked by chemical reactions or by irradiating selected parts of the thermoplastic material of the first material. In non-limiting examples, the first and second materials may be PE and IXPE, respectively, or PP and IXPP, respectively.

In some embodiments, the second material may comprise cork elements, preferably embodied as particles. Thereby, the restriction members may comprise or may entirely consist of the cork elements. For example, the cork elements may be 0.25-3.0 mm, such as 0.25-0.40 mm, along at least one direction, preferably in two or three perpendicular directions as described elsewhere herein.

The restriction members may be entirely embedded in the base matrix.

In some embodiments, a portion of at least some of the restriction members, such as all of them, may be exposed.

Generally herein, the restriction members may be separately formed from the base matrix. The base matrix may comprise cavities and the restriction members may be provided in the cavities. In a first example, the cavities are through holes, thereby fully penetrating the underlay element. In a second example, the cavities are blind holes, thereby not fully penetrating the underlay element.

The restriction members may be bonded to the base matrix, such as by an adhesive. Alternatively, the restriction members may be bonded to the base matrix by means of a press fit, such as when provided in the cavities. Yet alternatively, the second material may be encapsulated in the first material. For example, the second material may be mixed with the first material during formation of the underlay element, such as by extrusion. Preferably, the first and/or the second material comprises a polymeric material, such as a thermoplastic material or a thermosetting material, e.g., a rubber material, PU, resins of polyester, resins of epoxy, resins of silicon, melamine resins or furan resins, and, optionally, at least one filler. The second material may have a higher melting temperature than the first material, preferably such that the second material does not melt to any substantial degree under formation of the underlay element, such as by extrusion. Alternatively, or additionally, the second material may have a higher viscosity than the first material when the first and second materials are provided at the same temperature, which preferably is a temperature exceeding the glass transition temperature of the first material.

In some embodiments, the base matrix comprises a plurality of base members, such as beads or spheres or rectangular parallelepipeds, comprising the first material, preferably comprising a polymeric material, and the plurality of restriction members are separately formed. The base members comprising the first material, preferably comprises a polymeric material. The underlay element may further comprise a first and a second sheet, such as foils, at least partly enclosing the base members and the restriction members. Preferably, the base members and the restriction members are attached to the first and second sheets, such as by an adhesive. The sheets may retain the separately formed base members and restriction members in position. Advantages of this embodiment are that the manufacturing of a, preferably light-weight, underlay element may be simplified and/or may be made cheaper. Moreover, an integrated moisture barrier may be provided.

According to some embodiments, the restriction members may be integrally formed with the base matrix, which preferably is provided as a sheet assembly, such as a single sheet. The first and second materials may be based on the same, preferably thermoplastic, material, such as PP, PE or PVC. For example, the first material may be a thermoplastic material and the second material may be a cross-linked thermoplastic material. The second material may be cross-linked, for example by chemical reactions or by selective irradiation of the first material, such as directly after extruding a sheet comprising the first material.

In accordance with a second aspect of the disclosure, there is provided a floor assembly configured to be provided on a subfloor. The floor assembly comprises a floor covering, preferably comprising at least one floor panel, and an underlay element. The underlay element and/or the floor covering may be embodied as in any of the embodiments described in relation to the first aspect, whereby reference is made thereto. Furthermore, the following embodiments are conceivable.

The floor panel(s) may be vertically and/or horizontally interconnectable by means of a locking device. The locking device may be a mechanical locking device, for example comprising a vertical locking arrangement comprising a tongue and a groove and/or a horizontal locking arrangement comprising a locking element and a locking groove.

The floor covering may comprise a first and a second floor panel and the underlay element may be provided at least along joint edges of the first and second floor panels. Thereby, a displacement of the floor covering along the joint edges, e.g., at a location where a (mechanical) locking device is provided, may be reduced. The displacement may be reduced in a vertical direction, i.e., along the thickness direction of the underlay element and/or the floor covering.

The underlay element may be attached, e.g., pre-attached, to the floor covering, such as by an adhesive. Preferably, the underlay element is attached to a rear side of the floor covering. In some embodiments, however, the floor covering may be configured to be provided loosely on the underlay element, such that it may float thereon. In yet some embodiments, the underlay element may comprise friction members, such that the floor covering may be semi-attached to the underlay element. For example, the friction members may counteract sliding of the floor covering against the underlay element.

Aspects of the disclosure has mainly been described above with reference to a few embodiments. However, as is readily appreciated by a person skilled in the art, other embodiments than the ones disclosed above are equally possible within the scope of aspects of the disclosure.

Generally, all terms used in the claims and in the items in the embodiment section below are to be interpreted according to their ordinary meaning in the technical field, unless explicitly defined otherwise herein. All references to "a/an/ the [element, device, component, means, step, etc.]" are to be interpreted openly as referring to at least one instance of said element, device, component, means, step, etc., unless explicitly stated otherwise. Reference to one, two or a plurality of "at least one element", etc., may shortly be referred to as "the element(s)".

BRIEF DESCRIPTION OF THE DRAWINGS

The disclosure will in the following be described in connection to exemplary embodiments and in greater detail with reference to the appended exemplary drawings, wherein:

FIGS. 2a-2f schematically illustrate exemplary embodiments of an underlay element in cross-sectional side views along the section A-A and/or B-B in, e.g., FIG. 1a.

FIGS. 4a-4b schematically illustrate exemplary embodiments of a restriction member in perspective views.

FIGS. 4c-4f schematically illustrate exemplary embodiments of an underlay element in a perspective view (FIG. 4c) and in cross-sectional side views (FIGS. 4d-4f) along the section A-A and/or B-B in, e.g., FIG. 4c.

FIG. 4g schematically illustrates exemplary embodiments of a base member comprising a restriction member in side views.

FIGS. 6a-6d schematically illustrate in cross-sectional side views (FIGS. 6a-6c) and in a top view (FIG. 6d) exemplary embodiments of floor panels comprising a mechanical locking device used when testing samples of underlay elements, but which are conceivable in any embodiment herein.

FIG. 6e schematically illustrates an exemplary disc configuration of interlocked floor panels positioned on samples of underlay elements used when testing cupping effects.

FIG. 6f schematically illustrates exemplary pressure-compression graphs resulting from tests of samples of an underlay element.

DETAILED DESCRIPTION

The various aspects of the present disclosure will next be described with reference to, e.g., FIGS. 1a-1g, 2a-2f, 3a-3d, 4a-4g, 5a-5e and 6a-6d, which illustrate embodiments of an underlay element 1, embodiments of a floor assembly 20 comprising a floor covering 10 and an underlay element 1, and embodiments of compression an underlay element.

Figure 1A:
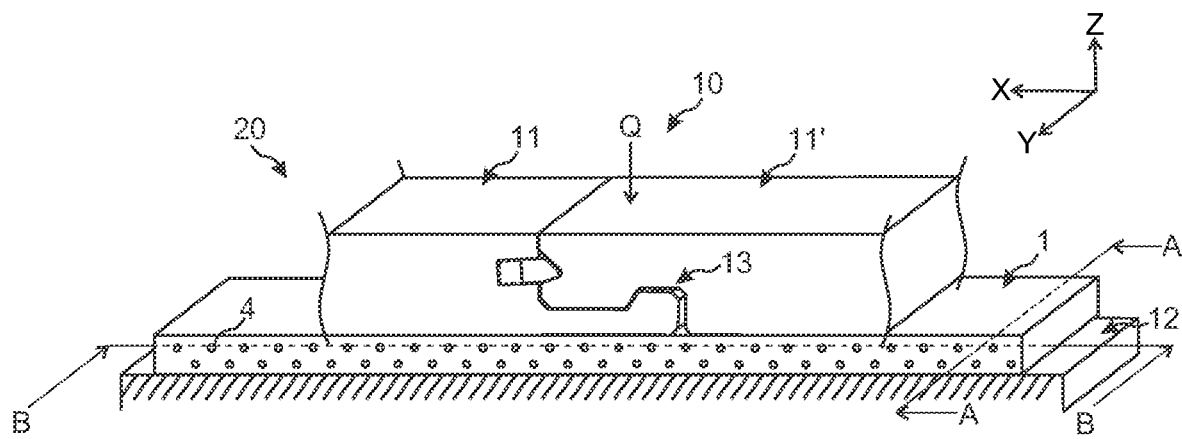
FIG. 1a-1b schematically illustrate an exemplary embodiment of a floor assembly comprising a floor covering and an underlay element in a perspective view (FIG. 1a) and in a cross-sectional side view (FIG. 1b).
Figure 1B:
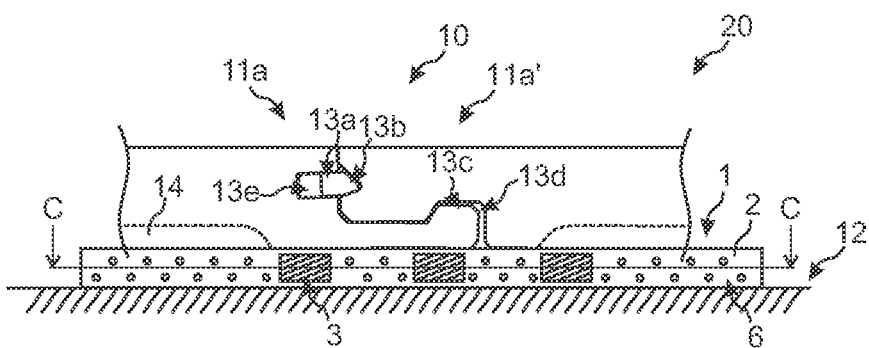

The underlay element 1 is preferably adapted for indoor use and is configured to be provided between a floor covering 10 and a subfloor 12, preferably being in contact with any or both of them during use. The underlay element may be provided loosely on the subfloor and the floor covering may be floating on the underlay element. In some embodiments, however, it may be attached to the floor covering and/or the subfloor, preferably by an adhesive. By way of example, the underlay element may be adapted to be used in conjunction with a thermoplastic floor covering, e.g., having a thickness of 2.0-8.0 mm, preferably 4.0-6.0 mm, or a thin laminate floor covering, e.g., having a thickness of 6.0-8.0 mm, but other floor coverings and thicknesses are equally conceivable. For example, the thermoplastic floor covering may comprise so-called Luxury Vinyl Tiles (LVT tiles), Stone Plastic (Polymer) Composite panels (SPC panels), or Expanded Polymer Core panels (EPC panels), also known as Water Proof Core panels (WPC panels). In some examples, the floor covering may comprise a thermosetting resin, such as polyurethane (PU), and may, e.g., have a thickness of 2.0-8.0 mm, preferably 4.0-6.0 mm. As shown in FIGS. 1a-1b, and also in FIGS. 6a-6d discussed below, the floor covering, such as in any of the above examples, may comprise floor panel(s), such as a first 11 and a second 11' floor panel, whose edges may be interconnectable by means of a locking device 13. The locking device may be a mechanical locking device, for example comprising a vertical locking arrangement comprising a tongue 13a and a groove 13b and/or a horizontal locking arrangement comprising a locking element 13c and a locking groove 13d. The tongue 13a may be a separate, preferably flexible, tongue displaceably mounted in a displacement groove 13e, see, e.g., FIGS. 1a-1b. Alternatively, the tongue 13a may be integrally formed with the floor panel, see, e.g., FIGS. 6a-6d. The underlay element 1 may be provided at least along joint edges 11a, 11a' of the panels, which for example may be long sides 15 and/or short sides 16.

Figure 1C:
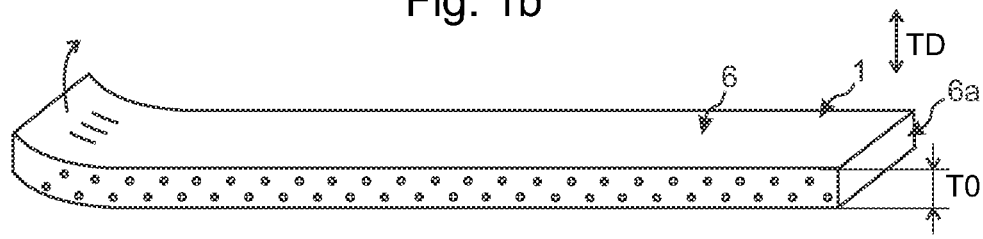
FIGS. 1c-1g schematically illustrate exemplary embodiments of an underlay element in perspective views (FIGS. 1c and 1d), a top view (FIG. 1e), and a side view (FIG. 1f) and an embodiment of a section of an underlay element in a side view (FIG. 1g).
Figure 1D:
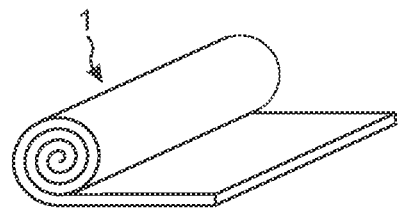
Figure 1E:
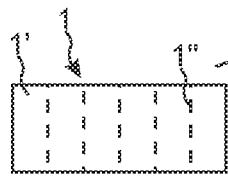
Figure 1F:
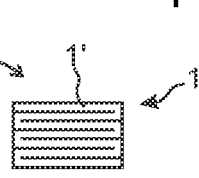

As illustrated in FIGS. 1c and 1d, the underlay element 1 may be flexible. In a preferred embodiment, and as shown in FIG. 1d, it may be adapted to be provided on a roll. In other embodiments, and as also shown in FIGS. 1e-1f, it may be adapted to be folded along folding portions 1" into a plurality of folded sections 1'. Preferably, the underlay element has a uniform thickness T0 and may be provided as a sheet assembly 6, such as a single sheet 6a or multiple sheets 6a, 6b. A preferred thickness T0 of the underlay element is 0.4-3.0 mm, such as 1.0-2.5 mm. The underlay element is compressible along its thickness direction TD, which in use is parallel with an ambient vertical direction Z. By means of its flexibility and/or compressibility, the underlay element may adapt its form and/or shape to the subfloor 12.

Figure 1G:
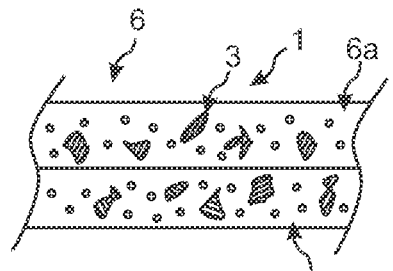
Figure 2A:
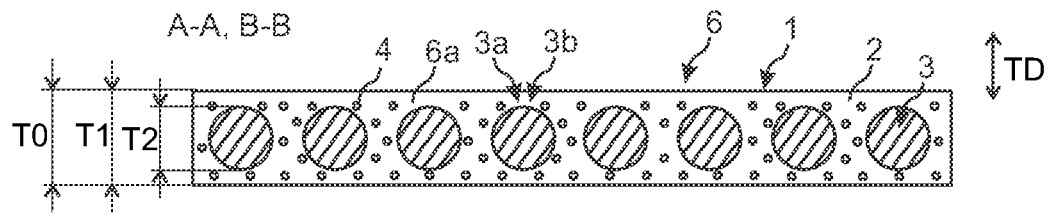

In any embodiment herein, such as in any of those in FIGS. 1a-1g, 2a-2f, 3a-3d and 5a-5e, the base matrix 2 may be provided as a sheet assembly 6 comprising at least one sheet 6a, such as comprising a single, preferably foamed, sheet 6a as illustrated in FIG. 2a or comprising a first 6a and a second 6b sheet as illustrated in FIG. 1g. The first 6a and/or the second 6b sheet may be foamed. Preferably, the first 6a and second 6b sheets are bonded to each other. The restriction members 3 may be at least partly embedded in the sheet assembly 6, such as in the sheets 6a, 6b.

The underlay element 1 comprises a base matrix 2 and a plurality of restriction members 3 at least partly embedded in the base matrix. FIGS. 2a-2f and 3a-3d illustrate such embodiments in cross-sectional side views and top views. The base matrix 2 comprises a first material and the restriction members 3 comprise a second material. A compression of at least a portion of the underlay element 1 is configured to be restricted by the restriction members 3.

When the underlay element 1 is provided under a floor covering 10 comprising floor panels, at least one, preferably a plurality of, restriction member(s) 3 may be positioned under an edge of the floor panel(s), which may comprise a locking device 13, cf. FIGS. 1a-1b and 6a-6d. Preferably, however, the entire underlay element 1 is configured to be restricted by the restriction members 3.

During use, a pressure Q is exerted on a top side of the floor covering in a direction toward the underlay element as illustrated in FIG. 1a.

The first material is compressible and preferably comprises a polymeric material, such as a thermoplastic material or a cross-linked thermoplastic material. For example, the first material may comprise PE, IXPE, EVA, PET, PP, XPP, PS, XPS, PS, EPS, PO, or XPO. As indicated above, the first material preferably is foamed, thereby comprising cells or pores 4 in a closed or an open cell structure. Moreover, a density of the first material preferably is less than 700 kg/m$^3$, preferably less than 500 kg/m$^3$.

Figure 5A:
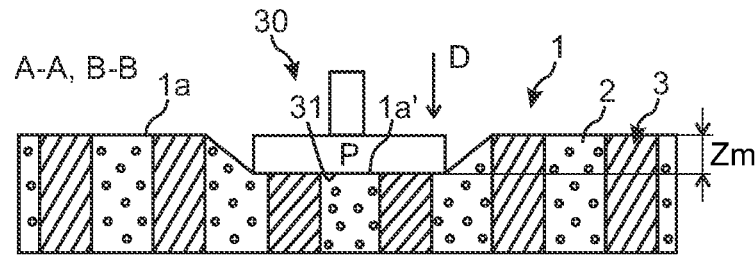
FIGS. 5a-5e schematically illustrate in side views or cross-section side views (FIGS. 5a-5b and 5e) and in a top view (FIG. 5c) exemplary embodiments of a compression of an underlay element and a pressure device in a bottom view (FIG. 5d).
Figure 5B:
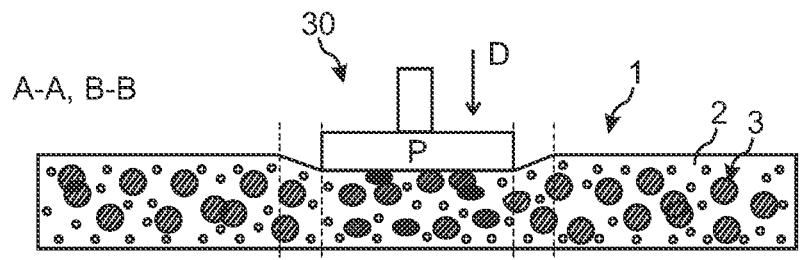
Figure 5C:
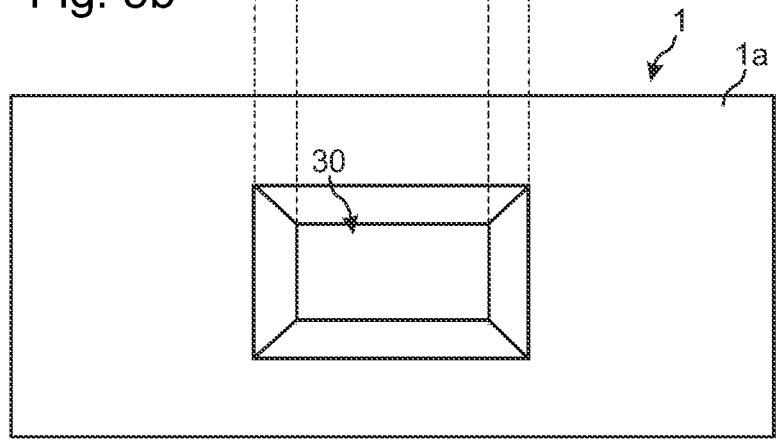
Figure 5D:
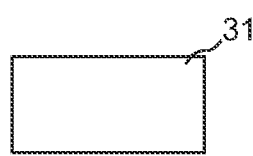
Figure 5E:
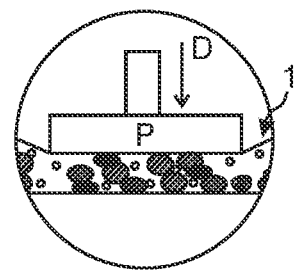

A portion of or the entire underlay element 1 may be compressed along the thickness direction TD. In preferred embodiments, when the thickness T0 is 1.0-3.0 mm, a compression, such as a maximal compression Zm, does not exceed 0.60 mm, preferably does not exceed 0.30 mm, at an applied pressure P of 1.90 MPa. FIGS. 5a-5b illustrate embodiments of a compression of an underlay element along the section A-A and/or B-B in, e.g., FIG. 1a or by analogy in FIGS. 2a-2f, and FIG. 5c illustrates the compression in any of FIGS. 5a-5b in a top view. A pressure device 30 is displaceable along a direction D, which preferably is parallel with the thickness direction TD during use of the pressure device, is shown to exert pressure on the top surface 1a via a pressure plate 31, which may have any form, e.g., rectangular, as shown in FIG. 5d, or circular. For example, a rectangular pressure plate with dimensions 5 cm×10 cm may provide a pressure P of 1.90 MPa when a force of 9.5 kN is applied, preferably at a rate of 0.1 mm/min. The compression, such as a maximal compression Zm, may be a distance from the top surface 1a in an uncompressed state to a, preferably innermost, compressed portion 1a' of the underlay element 1 in a compressed state, see, e.g., FIG. 5a. FIG. 5e is a sectional side view of the embodiment in FIG. 5b illustrating a further compression of the underlay element when the restriction members 3 further restrict the compression, e.g., by some of them contacting each other. In some embodiments, the compression is entirely restricted.

In some embodiments, when the thickness T0 of the underlay element 1 is 0.4-0.6 mm, the compression, such as a maximal compression Zm, does not exceed 0.20 mm at an applied pressure of 1.90 MPa.

Figure 2B:
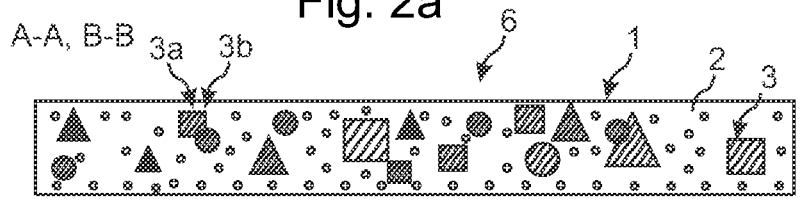
Figure 2C:
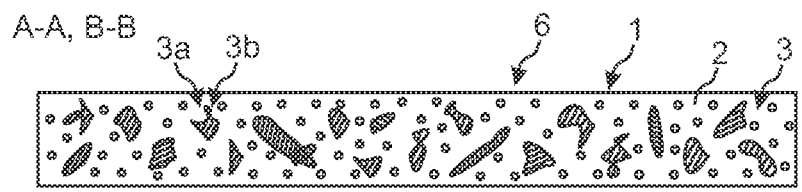

As shown in, e.g., the embodiments in FIGS. 2a-2c, the restriction members 3 may be entirely embedded in the base matrix 2. The restriction members may be separately formed from the base matrix. Alternatively, the restriction members may be integrally formed with the base matrix, for example being formed by chemical reactions or selective irradiation of the first material to form the second material.

Figure 2D:
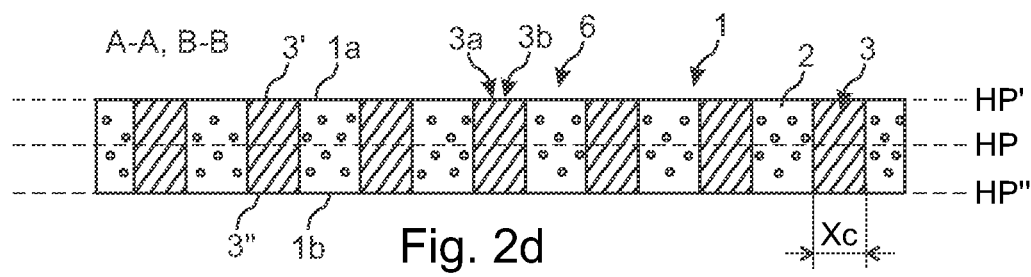
Figure 2E:
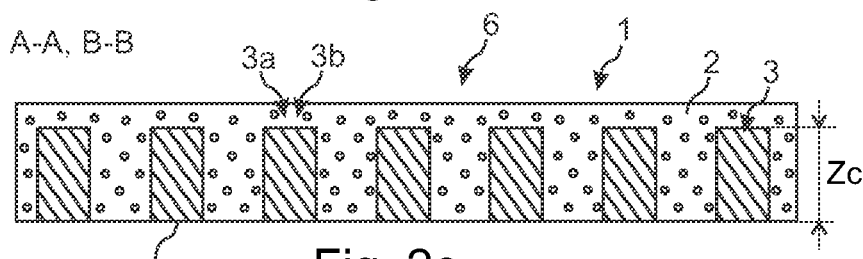
Figure 2F:
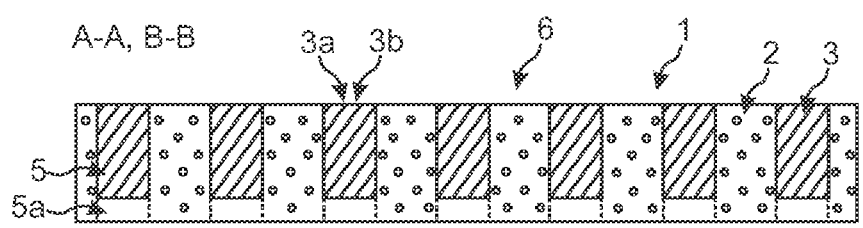

As shown in, e.g., the embodiments in FIGS. 2d-2f and 3a-3d, the preferably separately formed restriction members 3 may be partly embedded in the base matrix 2. A portion of the restriction members 3 may be exposed. Thereby, at least one surface of the restriction members 3 may face the first material and at least one surface may face away from the first material, such as facing towards or away from a top 1a and/or a bottom 1b surface of the underlay element. In some embodiments, and as shown in, e.g., FIGS. 2d-2f, the base matrix 2 may comprise cavities 5 and the restriction members 3 may be provided in the cavities. The restriction members may be bonded to the base matrix. FIGS. 2d, 2f and FIG. 2e illustrate cavities 5 in the form of through holes and a blind hole, respectively. A portion 3', 3" of the restriction members may be provided along a horizontal plane HP' and/or HP" provided along the top 1a and/or the bottom 1b surface, see, e.g., FIGS. 2d-2f. In FIG. 2f at least some, such as all, of the cavities are not completely filled by the restriction members. For example, a bottom portion of the cavities may comprise a space 5a. In some embodiments, however, and as obtained by inverting FIG. 2f, a top portion of the cavities may comprise the space 5a.

Figure 3A:
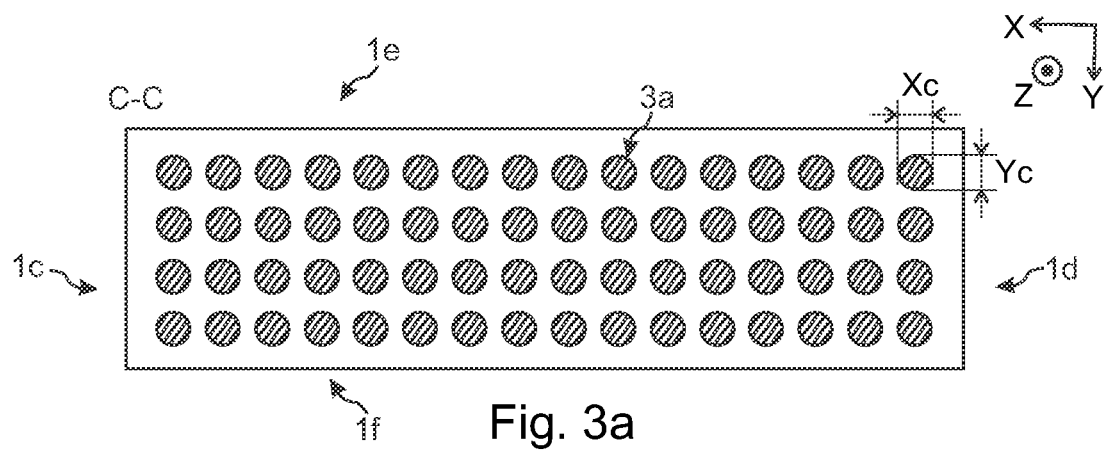
FIGS. 3a-3d schematically illustrate exemplary embodiments of an underlay element in top or bottom views and/or cross-sectional top views along a section C-C in, e.g., FIG. 1b.

As shown in, e.g., FIGS. 2d and 3a, but which is conceivable for any of the embodiments in, e.g., FIGS. 2a-2f, 3a-3d, a horizontal dimension Xc, Yc of each cavity may be smaller than 5 mm, such as smaller than 2 mm. For example, the horizontal dimension(s) of the cavity may be 1-5 mm, such as 1-2 mm, in at least one direction, such as two perpendicular directions, being provided along a horizontal plane HP which is parallel with the top 1a and/or bottom 1b surface, cf. FIG. 2d. Clearly, a height Zc of each cavity is limited by the thickness T0, cf. FIG. 2e.

A size of each of the restriction members exceeds 0.25 mm in at least one direction, such as in two or three perpendicular directions. In some embodiments, the size exceeds 0.30 mm, 0.40 mm, or even 1.00 mm, in at least one direction, such as in two or three perpendicular directions. In any of these cases, one direction may be parallel with the thickness direction TD of the underlay element 1. The other two directions may extend along a first X and a second Y horizontal direction of the underlay element, which may be parallel with a respective pair of edges of the underlay element, such as short edges 1c, 1d and long edges 1e, 1f.

As illustrated in, e.g., FIGS. 2a and 2d-2f, the restriction members 3 may have about the same sizes and/or shapes. As illustrated in, e.g., FIGS. 2b-2c, the restriction members 3 may have varying sizes and/or shapes. For example, the shapes and/or sizes may be irregular. In any of the embodiments, the restriction members may be essentially uniformly distributed throughout the base matrix 2.

In some embodiments, the second material is compressible. The second material may comprise a polymeric material, such as a thermoplastic material or a cross-linked thermoplastic material and, optionally, at least one filler. For example, the second material may comprise PVC and a filler, or a rubber material.

Preferably, a density and/or a modulus of elasticity E and/or a compressive strength CS of the second material is greater than that of the first material.

In some embodiments, the second material is substantially rigid and/or incompressible. For example, the second material may comprise a mineral-based material, such as CaCO3 or a sand material.

Figure 3B:
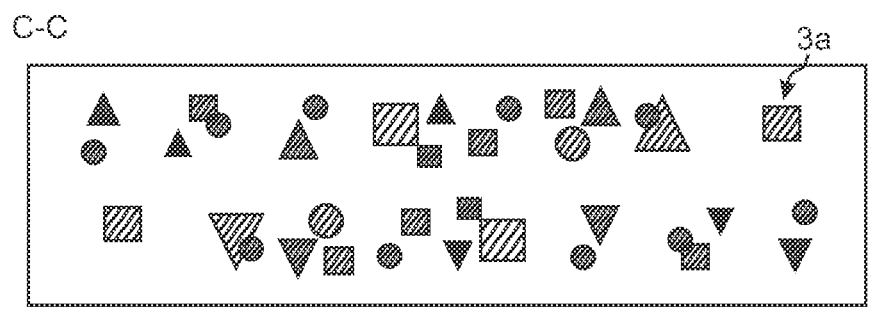
Figure 3C:
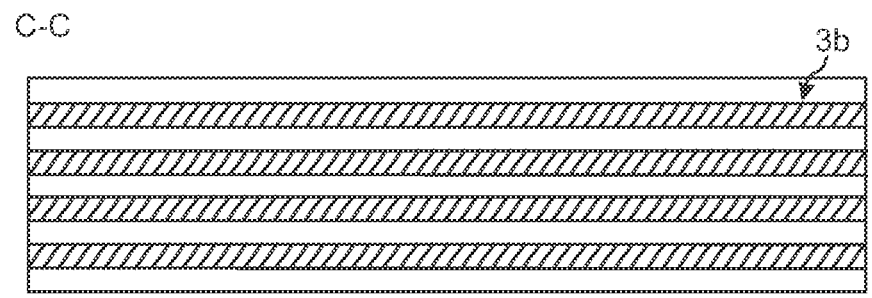
Figure 3D:
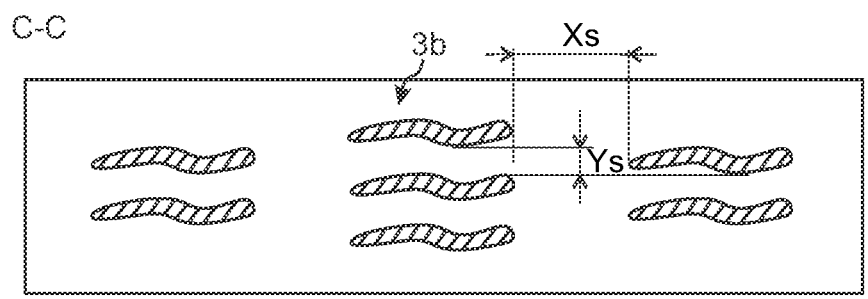

FIGS. 3a-3d schematically illustrate embodiments of an underlay element in top or bottom views and/or cross-sectional top views along a section C-C, cf. FIG. 1b. The underlay element in FIGS. 3a, 3b, 3c and 3d may correspond to the underlay element in any of FIGS. 2a-2f, and hence any of these embodiments may be combined. In FIG. 3c, the restriction members 3 extend between a pair of edges of the underlay element, such as between a pair of short edges 1c, 1d. In FIGS. 3a, 3b and 3d the restriction members 3 are spaced from an edge, such as from all four edges, 1c, 1d, 1e, 1f. The edges 1e, 1f may be long edges.

In some embodiments, and as is conceivable in, e.g., any of FIGS. 3a-3d, a size of the restriction members 3 may be smaller than or equal to the thickness T0 of the underlay element 1 and/or base matrix 2, such as in at least two perpendicular directions, preferably in three perpendicular directions X, Y, Z as shown in, e.g., FIGS. 3a-3b. For example, the restriction members may comprise particles 3a, such as granulates or flakes, and/or strips 3b, such as strings, cords or strands. Embodiments of particles 3a and strips 3b extending in three perpendicular directions are shown in FIGS. 4a and 4b, respectively.

In some embodiments, and as is conceivable, e.g., in any of the embodiments in FIGS. 3a-3d, the restriction members 3 may be larger than the thickness T0 in one direction or two perpendicular directions X, Y. For example, the restriction members may comprise particles 3a, such as granulates or flakes, and/or strips 3b, such as strings, cords or strands.

The underlay element 1 may comprise the second material to a degree exceeding 0.01 vol % and, preferably not exceeding 75 vol %. For example, when the restriction members 3, e.g., in the shape of spheres, are entirely embedded in the base matrix 2, the underlay element may comprise the second material to a degree of 0.03-50 vol %. Moreover, when at least a portion of the restriction members 3 is exposed, such as in the embodiments in any of FIGS. 2d-2f, optionally combined with the embodiment in FIG. 3c or 3d, the underlay element may comprise the second material to a degree not exceeding 38 vol %. Here and throughout the present disclosure, by vol % is meant percentage of a total volume of the underlay element.

In some embodiments, and as noted above, the restriction members 3 may be integrally formed with the base matrix 2, which preferably is provided as a sheet assembly 6, such as a single sheet 6a. Any of the embodiments shown in, e.g., FIGS. 2a-2f and 3a-3d may correspond to integrally formed restriction members 3. Thereby, the underlay element 1 may be substantially continuous without any cavities or holes being provided therein, apart from a possible foaming. For example, the first material may be a thermoplastic material and the second material may be a cross-linked thermoplastic material, wherein the first and second materials preferably are based on the same type of thermoplastic material, such as PP, PE or PVC.

In some embodiments, as shown, e.g., in FIGS. 4c-4g, the underlay element 1 may comprise a base matrix 2 comprising a plurality of base members 2', such as beads or spheres or rectangular parallelepipeds, comprising the first material, preferably comprising a polymeric material, such as EPS, which preferably is foamed. The base members 2' are preferably separately formed. The underlay element further comprises a plurality of separately formed restriction members 3, e.g., being provided as beads or spheres. The restriction members 3 are at least partly embedded in the base matrix 2 by being at least partly surrounded by and/or juxtaposed with the base members 2'. Optionally, at least some restriction members and base members may abut each other. A size of the restriction members 3 may exceed 0.25 mm in at least one direction, such as in two or, preferably, in three perpendicular directions X, Y, Z. In some embodiments, the size exceeds 0.30 mm, 0.40 mm, or even 1.00 mm, in at least one direction, such as in two or three perpendicular directions X, Y, Z. For example, the size of the restriction members 3 may be 0.35-2.95 mm.

In a first example, a size and/or a shape of the base members 2' and the restriction members 3 may be essentially the same. In a second example, a size and/or a shape of the base members 2' and the restriction members 3 may be different. In any of these examples, the size of the base members 2' may be 0.35-2.95 mm. When the sizes are different, preferably along the thickness direction TD, a reinforcing effect may occur at different stages of the compression of the underlay element, which may improve its cushioning effect. The underlay element comprises a sheet assembly 6 comprising a first 6a and a second 6b sheet, such as a first and a second foil. A thickness of the sheets may be 0.025-0.20 mm. The first and second foils may be thermoplastic foils, e.g., comprising PE, PET or PP. At least portions of the first 6a and second 6b sheets may be spaced from each other. The base members 2' and the restriction members 3 are at least partly, such as completely, enclosed by the first 6a and a second 6b sheets. For example, they may be attached to the sheets 6a, 6b by an adhesive.

A thickness T0 of the underlay element 1 in, e.g., FIGS. 4c-4g may be 0.4-3.0 mm, preferably 0.4-2.0 mm.

In FIGS. 4d-4e the thickness T0 of the underlay element 1 is essentially constant. In a first example, the sheets 6a, 6b are rigid and may, for example, be left appreciably undeformed under pressure from a floor covering 10. In a second example, the sheets 6a, 6b are flexible. In some cases, the sheets may be stretched for obtaining the essentially constant thickness.

In some embodiments, and as illustrated in FIG. 4d, a vertical extension of the base members 2' and of the restriction members 3 may be essentially the same. In some embodiments, and as illustrated in FIG. 4e, the vertical extension of the restriction members 3 may be smaller than the vertical extension of the base members 2'. Thereby, the base members 2' may be compressed in a first stage and the restriction members, and optionally the base members 2', may thereafter be compressed in a second stage.

In FIG. 4f, a thickness of the underlay element 1 varies, preferably between a thickness T0, which may be an outer thickness, and an inner thickness T0'. For example, the sheets 6a, 6b may be flexible and may at least partly adapt their shape to a shape of portions of the base members 2' and restriction members 3. The sheets 6a, 6b may be separately formed or may be integrally formed in a single sheet 6a.

Preferably, the separately formed restriction members 3 and the base members 2' are uniformly distributed between the sheets 6a, 6b.

In some embodiments, the restriction members 3 may be provided at least partly, such as completely, in the base members 2'. For example, any or even all of the base members and/or restriction members in any of, e.g., FIGS. 4c-4f may be replaced with base members comprising a restriction member, for example as schematically illustrated in any of the embodiments in FIG. 4g.

Moreover, especially for the underlay element in FIGS. 4c-4g, the compressive strength of the second material in the separately formed restriction members 3 may be at least 1.5 times, preferably, at least 2 times, the compressive strength of the first material in the base members 2'. Other embodiments of the compressive characteristics of the underlay element in, e.g., FIGS. 4c-4g may be the same as those of the embodiments described in relation to, e.g., FIGS. 1a-1g, 2a-2f, 3a-3d, 4a-4b and 5a-5e, whereby reference is made thereto. In a first example, the compression may not exceed 0.60 mm, preferably not exceeding 0.30 mm, at an applied pressure P of 1.90 MPa. In a second example, the compression of the separately formed restriction members 3 may not exceed 0.60 mm, preferably not exceeding 0.30 mm, at an applied pressure P of 1.90 MPa.

Other embodiments and examples of the embodiments in FIGS. 4c-4g, such as with regards to the first and/or the second material, the density, or the E-module(s), may be the same as those in the embodiments in FIGS. 1a-1g, 2a-2f, 3a-3d, 4a-4b and 5a-5e, whereby reference is made thereto.

Generally herein, e.g., in any of the embodiments in FIGS. 1a-1g, 2a-2f, 3a-3d, 4a-4g and 5a-5e, the compression may be restricted by not exceeding 50%, such as not exceeding 30% or not exceeding 20%, of an uncompressed, preferably maximal, thickness of the underlay element.

As noted above, the underlay element 1 may be attached to the floor covering 10, such as by an adhesive. For example, such a floor assembly 20 may be embodied as in FIGS. 1a-1b. The underlay element 1 and/or the floor covering 20 may be embodied as in any of the FIGS. 1a-1g, 2a-2f, 3a-3d, 4a-4g, 5a-5b and 6a-6d, whereby reference is made thereto.

In some embodiments, and as indicated in FIG. 1b, each floor panel 11, 11' may comprise grooves 14, preferably being provided in the rear side of the floor panel. The floor panels and/or grooves may be embodied, e.g., as the board element or panel and/or grooves described on page 44, lines 7-19 and page 49, line 21 to page 51, line 2 and in FIGS. 13a-13d and 14a-14g in WO 2020/180237 A1, all of which hereby is incorporated by reference in its entirety.

Example 1

The following examples further describe and demonstrate embodiments within the scope of the present disclosure. The examples are given solely for the purpose of illustration and are not to be construed as limitations of the present disclosure, as many variations thereof are possible without departing from the spirit and scope of the aspects described herein.

Floor coverings positioned on three groups of samples S1(j), S2(j) and S3(j) of underlay elements (with j=0, 1, 2, . . . ) were subjected to a Castor chair (CC) test in accordance with the ISO standard 4918:2016 (with Type W Castors and the recommended underlay replaced by the samples). The samples of each group included the same type of base matrix (BM) 2, but had different configurations of restriction members 3. Each group Si(j) (with i=1, 2, 3) included a reference sample Si(0) comprising the same kind of base matrix as in the other samples of the group, but was not provided with any restriction members. S1(j), S2(j) and S3(j) included a base matrix BM1, BM2 and BM3 in the form of a foamed EVA-based sheet, a foamed XPS sheet, and a foamed PO sheet, respectively, with a respective CS value at 0.5 mm deformation of 160, 500 and 60 kPa and densities 160 kg/m$^3$, 110 kg/m$^3$ and 85 kg/m$^3$, respectively. Table 1 discloses the maximal thicknesses T0 of the samples.

S1(1) and S2(1) were embodied as a combination of the embodiments in FIGS. 3c and 3d, respectively, and FIG. 2f. The restriction members included LVT strips being shaped as rectangular parallelepipeds having widths 7 mm and heights 1.3 mm, comprising PVC, a plasticizer, additives and mineral fillers, and having a flexural strength of 7.1 MPa, an E-module of 397 MPa and a density of 1970 kg/m$^3$. The LVT strips in S1(1) were separated by base matrix strips, each having a width of 20 mm and a height of 1.5 mm. The LVT strips and base matrix strips extended side-by-side in abutment between a pair of opposing edges of the underlay element. The LVT strips in S2(1) had a length of 50 mm and were inserted in cavities provided in the base matrix, wherein each cavity had substantially the same dimensions as the corresponding LVT strip, except that there was a space 5a of about 0.2 mm in S2(1) facing upwards. The LVT strips were separated by a distance Xs=50 mm and Ys=20 mm, cf. FIG. 3d. The LVT strips and base matrix (segments) of S1(1) and S2(1) were kept together by adhesive tape provided along the top 1a or bottom 1b surface.

Each of S3(j) (for j>0) was embodied as a combination of the embodiments in FIGS. 2f and 3a. BM3 comprised a square lattice of cylindrical cavities in the form of through holes of diameter 2.5 mm in which the restriction members were provided. The cavities were separated by 8.2 mm. The restriction members in S3(1) and S3(3) included a wood glue and a PU-based glue, respectively, which were provided in the cavities. The wood glue was a white one-component PVAc glue having a solid content of 46 vol %. A small space 5a was formed after curing of the glue. The restriction members in S3(2) included cylindrically shaped polylactic acid (PLA) pellets having a height of about 1.8 mm and a radius of 1.75 mm.

During testing a 4 mm floor covering comprising thermoplastic-based panels was positioned on the sample. More specifically, a first type of floor covering in the form of SPC panels comprising PVC and a mineral filler and having a flexural strength of 27.2 MPa, an E-module of 6320 MPa and a density of 2000 kg/m$^3$ was used for S1(j) and a second type of floor covering in the form of SPC panels comprising PVC and a mineral filler and having a flexural strength of 30.0 MPa, an E-module of 6022 MPa and a density of 2008 kg/m$^3$ was used for S2(j) and S3(j). The panels 11, 11', 11" comprised an integrally formed mechanical locking device 13 at the edges by means of which they were interlocked horizontally and vertically. The long sides 15 of the panels (see FIG. 6a) were configured to be locked by angling A of the panels 11, 11' and comprised a tongue 13a and a groove 13b as well as a locking element 13c and a locking groove 13d. The short sides 16 (see FIGS. 6b-6c) were configured to be locked by a vertical folding V of one panel 11" against another panel 11 and comprised a locking element 13c and a locking groove 13d for horizontal locking. As shown in FIG. 6b, the short-side vertical locking of the first type of floor covering was provided by engaging inclined surfaces 13f, 13g on the locking element and locking groove, which inclined surfaces also provided the horizontal locking. As shown in FIG. 6c, the short-side vertical locking of the second type of floor covering was provided by a small tongue 13a and a small groove 13b, which allowed for vertical folding. The engaging surfaces 13f, 13g were disposed substantially vertically. FIG. 6d illustrates a panel 11 in any of FIGS. 6a-6c in a top view. As schematically shown in FIG. 6e, the panels were interlocked in a disc configuration 17 including the samples of underlay elements specified above.

The results of the CC tests in accordance with the ISO standard 4918:2016 are summarized in Table 1. The test was aborted when a portion of the floor covering delaminated (DL) and/or when cracks (CR) were formed therein, such as in the surface. As indicated in Table 1, all tests apart from the test of S3(3), which saturated the maximum number of cycles, were aborted and hence "failed" according to the standard. When aborted, the number of cycles carried out were read off. It may be seen that, compared with the reference sample Si(0), the number of cycles increased significantly for the samples S1(j), S2(j) and S3(j) that included restriction members. In particular, due to the restricted compression of these samples, the mechanical locking devices provided at the edges of the panels became less damaged. It is also noted that the improvements were visually to be seen, e.g., in the form of a reduced degree of delamination and/or a reduced appearance of cracks in the floor covering.

TABLE 1

Castor Chair measuring results

| Sample | BM | T0 (mm) | Cycles | Damage Type |
|---|---|---|---|---|
| S1(0) | BM1 | 1.5 | 4 500 | DL |
| S1(1) | | | 15 000 | CR |
| S2(0) | BM2 | 1.5 | 9 300 | DL |
| S2(1) | | | 15 300 | DL |
| S3(0) | BM3 | 2.0 | 6 000 | DL |
| S3(1) | | | 8 300 | DL, CR |
| S3(2) | | | 11 700 | DL, CR |
| S3(3) | | | 25 000 | CR |

The same CC test was also performed on a second, hybrid, sample S1(2) belonging to the first group. As seen from a top view, half of S1(2) was embodied as S1(0) and the other half was embodied as S1(1), and the CC test was performed over a center of the sample. The test was aborted after 6 000 cycles when cracks were formed in the half of S1(2) that was embodied as S1(0). No visible cracks or signs of delamination were detected in the half of S1(2) that was embodied as S1(1) and hence comprised restriction members.

Furthermore, floor coverings positioned on a group of samples T(j) of underlay elements (with j=0, 1, 2) were subjected to a similar CC test in accordance with the ISO standard 4918:2016. The samples T(j) included a reference sample T(0) and two configurations of restriction members 3 (samples T(1) and T(2)). The base matrix BM of T(j) was provided in the form of a foamed XPS sheet including a conventional 0.03 mm thick moisture barrier in the form of a foil comprising aluminium and PE. The base matrix BM had a CS value at 0.5 mm deformation of 700 kPa and a density of 127 kg/m³. The maximal thickness T0 was 1 mm.

T(1) and T(2) were formed as a combination of the embodiments in FIGS. 3a and 3c, respectively, and FIG. 2e (the underlay element shown therein being turned upside down). T(1) was provided with a square lattice of cylindrical cavities in the form of blind holes of diameter 3.4 mm and height 0.8 mm. The cavities were separated by 4.6 mm. T(2) was provided with longitudinally extending continuous and parallel cavities in the form of blind holes having a rectangular cross-section with a width of 3.0 mm and height 0.8 mm. The cavities were transversely separated by 4 mm. The restriction members in T(1) and T(2) were formed by a PU-based glue comprising 83.3 wt % of polyols and fillers and 16.7 wt % of a toluene diisocyanate which were provided in the cavities. The glue was hardened for at least a week and obtained a hardness (Shore D) of 41.

During testing, a 4 mm floor covering comprising SPC panels was positioned on the samples T(j). The SPC panels comprised PVC and a mineral filler and had a flexural strength of 22.0 MPa, an E-module of 6184 MPa and a density of 1989 kg/m³. The panels comprised an integrally formed mechanical locking device 13 at the long and short edges similar to those described above and shown in FIG. 6a and FIGS. 6b-6c, respectively. Indeed, the short-side vertical locking was a combination of the first and second types of floor covering including the small tongue and groove 13a, 13b as well as the engaging inclined surfaces 13f, 13g.

CC tests were conducted in accordance with the standard ISO 4918:2016. The test was aborted when a portion of the floor covering delaminated (DL), which happened for each of T(0), T(1) and T(2). When aborted due to a "failure" according to the standard, the number of cycles carried out were read off: the T(0) test was aborted at 3000 cycles, while T(1) and T(2) were each aborted at 7000 cycles. Hence, as compared to T(0), the number of cycles before "failure" increased significantly for the samples T(1) and T(2) including restriction members.

Finally, and as shown in Table 2, a number of cupping tests were conducted on the floor coverings positioned on the samples T(j) after various number of cycles specified from the CC test above had been performed. The tests were performed in compliance with the standard ISO 10582:2017 (Annex B), with the modification that eight SPC panels including the samples T(j) were interlocked in the disc configuration 17 according to ISO 4918:2016 specified above, see FIG. 6e. Moreover, the measurements were consistently performed at two locations L1 and L2 situated 50 mm from the short edges 16 of the right and left panel 11 in the third and second row from above, respectively, see FIG. 6e. The cupping effects (CE) at L1 and L2 were determined, expressed in percentages and were normalized to zero cupping at zero cycles according to the formula 100%*(C(W)−C(0))/d, where C(W) is the width surface flatness at W cycles and d=229 mm is defined in said Annex B. It may be seen from Table 2, that, for a given number of cycles, CE decreased significantly for the samples T(1) and T(2) as compared to T(0). All panels became concave at non-zero cycles.

TABLE 2

Cupping measuring results

| Sample | Cycles | CE (%) at L1 | CE (%) at L2 |
|---|---|---|---|
| T0 | 1 000 | 0.10 | 0.18 |
|  | 3 000 | 0.17 | 0.26 |
|  | 5 000 | 0.30 | 0.37 |
| T1 | 1 000 | 0.04 | 0.14 |
|  | 3 000 | 0.09 | 0.18 |
|  | 5 000 | 0.15 | 0.21 |
|  | 7 000 | 0.24 | 0.26 |
|  | 10 000 | 0.34 | 0.34 |
| T2 | 1 000 | 0.06 | 0.10 |
|  | 3 000 | 0.11 | 0.14 |
|  | 5 000 | 0.15 | 0.16 |
|  | 7 000 | 0.21 | 0.20 |
|  | 10 000 | 0.36 | 0.33 |

Example 2

Three samples U(0), U(1) and U(2) of an underlay element 1 were compressed by means of a pressure device 30 comprising a rectangular 5×10 cm pressure plate 31 described in detail in relation to FIGS. 5a-5d. Each sample U(j), j=0, 1, 2 comprised a base matrix with a material identical to that of BM1 described above. U(0) was a reference sample without any restriction members. U(1) was embodied in complete analogy with S1(1), including the material composition and the characteristics of the LVT strips, except that the LVT strips had widths 15 mm and heights 1.3 mm, and that the base matrix strips had a width of 15 mm and a height of 1.5 mm. U(2) was embodied identically to U(1), except that the restriction members instead included two nitrile rubber cords, NBR, having a hardness (Shore A) of 70 and a diameter of 1.6 mm. The cords extended side-by-side in abutment and were sandwiched between base matrix strips.

The result of a momentarily applied pressure as a function of a compression of the samples U(j) is shown in FIG. 6f. For obtaining more accurate measurements, the compression was determined from a pre-compressed state of the sample obtained by applying a preloading force of 5 N by means of the pressure plate. Moreover, a force continuously increasing from the preloading force up to 9.5 kN was applied at a rate of 0.1 mm/min. It may be seen that the compression of the samples U(1) and U(2) were more restricted compared to the reference sample U(0). In particular, U(1) and U(2) were compressed to about 0.7 mm and about 0.2 mm, respectively, at an applied pressure P of 1.90 MPa.

Aspects of the disclosure has mainly been described above with reference to a few embodiments. However, as is readily appreciated by a person skilled in the art, other embodiments than the ones disclosed above are equally possible within the scope of the disclosure. For example, in any embodiment herein, the underlay element may optionally further comprise a thin foil or a film, for example comprising PE or being metallized, attached, such as laminated, to the base matrix. Such a foil or a film of, e.g., 0.01-0.05 mm or 0.20 mm in thickness may provide an additional moisture barrier and/or a vapour barrier to the underlay element. It is emphasized that the disclosure includes illustrative embodiments in which the restriction members 3 in any of, e.g., FIGS. 1a-1g, 2a-2f, 3a-3d, 4a-4g and 5a-5e comprise or entirely consist of cork elements having a size of 0.25-3.0 mm, such as 0.25-0.40 mm, and when T0 is 0.4-3.0 mm, such as 1.0-2.5 mm. Moreover, embodiments in which the first material is not foamed are included in the present disclosure.

EMBODIMENTS

Further aspects of the disclosure are provided below. Embodiments, examples etc. of these aspects are largely analogous to the embodiments, examples, etc. as described above, whereby reference is made to the above for a detailed description.

Item 1. Underlay element (1) configured to be provided between a floor covering (10) and a subfloor (12), the underlay element comprising a base matrix (2) and a plurality of restriction members (3) at least partly embedded in said base matrix,
  wherein the base matrix (2) comprises a first material, the first material being compressible and, preferably, foamed,
  wherein the restriction members (3) comprise a second material, a size of each of the restriction members exceeding 0.25 mm in at least one direction, and
  wherein a compression of at least a portion of the underlay element (1), such as the entire underlay element, is configured to be restricted by the restriction members (3).

Item 2. The underlay element according to item 1, wherein said compression does not exceed 0.60 mm, preferably not exceeding 0.30 mm, at an applied pressure (P) of 1.90 MPa.

Item 3. The underlay element according to item 1 or 2, wherein a thickness (T0) of the underlay element is 0.4-3.0 mm.

Item 4. The underlay element according to any of the preceding items, wherein the size of the restriction members exceeds 1.00 mm in at least one direction.

Item 5. The underlay element according to any of the preceding items, wherein the size of the restriction members exceeds 0.25 mm, for example exceeding 1.00 mm, in two or three perpendicular directions.

Item 6. The underlay element according to any of the preceding items, wherein the restriction members (3) have about the same sizes and/or shapes.

Item 7. The underlay element according to any of the preceding items, wherein the restriction members (3) have varying sizes and/or shapes.

Item 8. The underlay element according to any of the preceding items, wherein the restriction members (3) comprise particles (3a) and/or strips (3b).

Item 9. The underlay element according to any of the preceding items, wherein a density of the second material is greater than a density of the first material.

Item 10. The underlay element according to any of the preceding items, wherein a density of the first material is less than 700 kg/m$^3$, preferably less than 500 kg/m$^3$.

Item 11. The underlay element according to any of the preceding items, wherein a modulus of elasticity of the second material is greater than a modulus of elasticity of the first material.

Item 12. The underlay element according to any of the preceding items, wherein the first material comprises a polymeric material, such as a thermoplastic material or a cross-linked thermoplastic material.

Item 13. The underlay element according to any of the preceding items, wherein the second material is compressible.

Item 14. The underlay element according to any of the preceding items, wherein a compressive strength of the second material is greater than a compressive strength of the first material.

Item 15. The underlay element according to any of the preceding items, wherein the second material comprises a polymeric material, such as a thermoplastic material or a cross-linked thermoplastic material, and/or a mineral-based material.

Item 16. The underlay element according to any of the preceding items, wherein the restriction members (3) are entirely embedded in said base matrix (2).

Item 17. The underlay element according to any of the preceding items, wherein the base matrix (2) comprises cavities (5) and wherein the restriction members (3) are provided in the cavities.

Item 18. The underlay element according to any of the preceding items, wherein the base matrix (2) comprises a plurality of base members (2'), wherein the plurality of restriction members (3) are separately formed, and wherein the underlay element (1) further comprises a first (6a) and a second (6b) sheet at least partly enclosing the base members and the restriction members.

Item 19. The underlay element according to any of the preceding items, wherein the first material comprises at least one filler, preferably comprising an organic filler and/or an inorganic filler.

Item 20. A floor assembly (20) configured to be provided on a subfloor (12), the floor assembly comprising a floor covering (10), preferably comprising at least one floor panel (11), and an underlay element (1) according to any of the preceding items 1-18.

Item 21. The floor assembly according to item 20, wherein the floor covering (10) comprises a first (11) and a second (11') floor panel, and wherein the underlay element (1) is provided at least along joint edges (11a; 11a') of the first and second floor panels.

Item 22. The floor assembly according to item 20 or 21, wherein the underlay element (1) is attached to the floor covering (20), such as by an adhesive.

The invention claimed is:

1. Underlay element configured to be provided between a floor covering and a subfloor, the underlay element comprising a base matrix and a plurality of restriction members at least partly embedded in said base matrix,
  wherein the base matrix comprises a first material comprising a polymeric material, the first material being foamed, the first material being compressible, and the first material having a density of less than 700 kg/m$^3$,
  wherein the restriction members comprise a second material, a size of each of the restriction members exceeding 0.25 mm in two or three perpendicular directions, wherein one of these directions is parallel with a thickness direction of the underlay element,
  wherein a compression of at least a portion of the underlay element is configured to be restricted by the restriction members, and
  wherein the base matrix comprising the first material overlaps the restriction members above and/or below the restriction members in the thickness direction of the underlay element.

2. The underlay element according to claim 1, wherein said compression does not exceed 0.60 mm, at an applied pressure of 1.90 MPa.

3. The underlay element according to claim 1, wherein a thickness of the underlay element is 0.4-3.0 mm.

4. The underlay element according to claim 1, wherein the size of the restriction members exceeds 1.00 mm in at least one direction.

5. The underlay element according to claim 1, wherein the size of the restriction members exceeds 1.00 mm in the two or three perpendicular directions, wherein one of these directions is parallel with said thickness direction.

6. The underlay element according to claim 1, wherein the restriction members have about the same sizes and/or shapes.

7. The underlay element according to claim 1, wherein the restriction members have varying sizes and/or shapes.

8. The underlay element according to claim 1, wherein the restriction members comprise particles and/or strips.

9. The underlay element according to claim 1, wherein a density of the second material is greater than a density of the first material.

10. The underlay element according to claim 1, wherein a density of the first material is less than 500 kg/m$^3$.

11. The underlay element according to claim 1, wherein the first material comprises a thermoplastic material or a cross-linked thermoplastic material.

12. The underlay element according to claim 1, wherein the second material is compressible, a compressive strength of the second material being greater than a compressive strength of the first material.

13. The underlay element according to claim 1, wherein the second material comprises a polymeric material and/or a mineral-based material.

14. The underlay element according to claim 1, wherein the restriction members are entirely embedded in said base matrix.

15. The underlay element according to claim 1, wherein the base matrix comprises cavities and wherein the restriction members are provided in the cavities.

16. The underlay element according to claim 1, wherein the base matrix comprises a plurality of base members, wherein the plurality of restriction members are separately formed, and wherein the underlay element further comprises a first and a second sheet at least partly enclosing the base members and the restriction members.

17. The underlay element according to claim 1, wherein the first material comprises an organic filler and/or an inorganic filler.

18. A floor assembly configured to be provided on a subfloor, the floor assembly comprising:
    a floor covering, the floor covering comprising at least one floor panel; and
    the underlay element according to claim 1;
    wherein the underlay element is configured to be disposed between the floor covering and the subfloor.

19. The floor assembly according to claim 18, wherein the floor covering is a thermoplastic floor covering including floor tiles or panels.

* * * * *